(12) United States Patent
Lübcke

(10) Patent No.: US 11,161,454 B2
(45) Date of Patent: Nov. 2, 2021

(54) MOTOR VEHICLE

(71) Applicant: AUDI AG, Ingolstadt (DE)

(72) Inventor: Michael Lübcke, Gaimersheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/988,324

(22) Filed: Aug. 7, 2020

(65) Prior Publication Data

US 2021/0046871 A1 Feb. 18, 2021

(30) Foreign Application Priority Data

Aug. 13, 2019 (DE) ..................... 10 2019 212 124.1

(51) Int. Cl.
*B60R 1/00* (2006.01)
*G05D 1/02* (2020.01)

(52) U.S. Cl.
CPC ............. *B60R 1/00* (2013.01); *G05D 1/0246* (2013.01); *B60R 2300/102* (2013.01); *B60R 2300/105* (2013.01); *B60R 2300/301* (2013.01); *B60R 2300/303* (2013.01); *B60R 2300/304* (2013.01)

(58) Field of Classification Search
None
See application file for complete search history.

(56) References Cited

U.S. PATENT DOCUMENTS

| 2016/0257248 | A1  |        | 9/2016 | Lisseman et al. |           |
|--------------|-----|--------|--------|-----------------|-----------|
| 2018/0139384 | A1  | *      | 5/2018 | Li              | G06T 11/60 |
| 2019/0100106 | A1  | *      | 4/2019 | Chen            | G06T 3/4038 |
| 2019/0100141 | A1  |        | 4/2019 | Angst           |           |
| 2019/0135216 | A1  | *      | 5/2019 | Church          | B60R 1/00 |
| 2019/0279512 | A1  | *      | 9/2019 | Daniel          | B60Q 9/008 |
| 2020/0298758 | A1  | *      | 9/2020 | Ardalkar        | A01M 29/18 |

FOREIGN PATENT DOCUMENTS

| DE | 102013207907 A1 | 10/2014 |
| DE | 102016002388 A1 | 9/2016 |
| DE | 102016107421 A1 | 10/2017 |
| DE | 102016208369 A1 | 12/2017 |
| DE | 102017216791 A1 | 5/2019 |
| GB | 2559760 A | 8/2018 |

* cited by examiner

*Primary Examiner* — Rebecca A Volentine
(74) *Attorney, Agent, or Firm* — Sterne, Kessler, Goldstein & Fox P.L.L.C.

(57) ABSTRACT

A motor vehicle, having a plurality of image recording devices arranged across the entire vehicle for recording images of the vehicle environment, includes a control device for generating an image representation showing the 360° environment around the motor vehicle on the basis of the images. The motor vehicle further includes a display device for displaying the image representation. The control device is designed to generate an additional partial image representation showing the area below the motor vehicle on the basis of images recorded, and to integrate the partial image representation into the displayed image representation for outputting an overall image representation. At least one sensor device is provided which detects the area below the motor vehicle and communicates with the control device. The overall image representation can be modifiable at least in the area of the partial image representation on the basis of the sensor information.

11 Claims, 2 Drawing Sheets

MOTOR VEHICLE

TECHNICAL FIELD

The disclosure relates to a motor vehicle, having a plurality of image recording devices arranged across the entire vehicle for recording images of the vehicle environment, a control device for generating an image representation showing the 360° environment around the motor vehicle on the basis of the images, and a display device for displaying the image representation, wherein the control device is designed to generate an additional partial image representation showing the area below the motor vehicle on the basis of images recorded before the images, on which the displayed image representation is based, and to integrate the partial image representation into the displayed image representation for outputting an overall image representation.

BACKGROUND

Modern motor vehicles have the option, if desired, of generating an image representation showing the 360° environment around the motor vehicle and outputting it on a suitable monitor. A system that makes this possible is frequently called "top view" or "surround view" or the like. As a rule, it uses four cameras, namely one camera arranged on the front of the vehicle and one on the rear of the vehicle, and one camera each arranged on the side, for example, on the side-view mirrors. Each camera provides separate images or image data, which are recorded and processed or computed jointly by a control device in order to generate and subsequently output a virtual top view, i.e., a two-dimensional top view of the motor vehicle and its environment, or a virtual three-dimensional view with a three-dimensional vehicle model as self-representation and possibly a freely selectable perspective. Such an image of the environment consequently enables the driver to record the entire vehicle environment to the extent that the individual cameras record toward the side.

The currently recorded images allow for a display of the current vehicle environment on the side of the vehicle, which can be viewed virtually "live." However, this is not the case for the area below the vehicle because no camera is arranged there. Already known systems frequently operate in such a way that the area below the vehicle is displayed as a rectangle which is either black or shaded or also colored to match the environment. This area is also called "ground plane" and is sometimes larger, e.g., in the case of cars, in the vehicle longitudinal direction than the vertical projection of the vehicle, since the front and rear cameras only detect the ground in front of and behind the vehicle at a certain distance because the respective bumper limits the downward view and creates a blind spot.

In addition to displaying the area as a colored or shaded rectangle, it is also known to fill this area, i.e., the "ground plane," with sampled image or video data, i.e., to generate and integrate into the image representation a partial image representation using images that were recorded before the currently recorded images or before the images, on which the displayed image representation is based. This means that, depending on the direction of travel, image data are recorded in front of or behind the vehicle and buffered, so that the current environment below the vehicle can be effectively recalculated on the basis of the previously recorded image data and integrated as a partial image representation. For the driver, this results in an overall image representation from the effectively current image representation created on the basis of the last recorded images, and the calculated, sampled partial image representation computed on the basis of image data recorded prior thereto. Filling the "ground plane" with such sampled data is known, for example, from DE 10 2016 208 369 A1.

In this context, it is also known to switch, for example, the three-dimensional vehicle model to (semi-)transparent, if necessary, thus providing a view under and behind the schematically displayed vehicle model. This is expedient when driving on difficult ground or when a charging plate for electric/hybrid vehicles is to be targeted under the vehicle floor, or generally for improving the view in the 3D scene, e.g., of objects lying behind the vehicle from the perspective of the virtual camera.

The problem with such a filling of the "ground plane" with buffered image data, i.e., with the display of such a partial image representation, and possibly also the transparent vehicle display, is that the availability of the buffered data is low. When driving slowly or at a standstill, they have to be deleted again after a short period of time because it is not known whether, temporarily, there are objects under the vehicle that were not previously visible. For example, a ball, a cat, or a child may have found its way under a vehicle driving or standing in a garage, which is possible due to the large temporal offset between the images or image data used for creating the partial image representation and the current display time.

DETAILED DESCRIPTION

Figure 1:
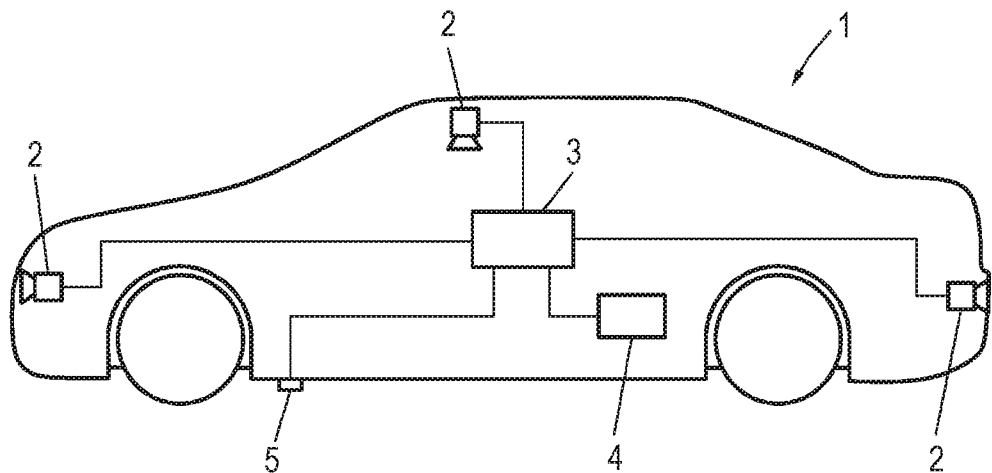
FIG. 1 illustrates a schematic diagram of a motor vehicle, according to some embodiments of the present disclosure.

This problem is addressed by the present disclosure, providing a motor vehicle improved in the respect.

In some embodiments, in a motor vehicle of the initially described type, at least one sensor device is provided which detects the area below the motor vehicle and communicates with the control device, wherein the overall image representation consisting of image representation and partial image representation is modifiable at least in the area of the partial image representation on the basis of the sensor information.

According to some embodiments of the present disclosure, at least one sensor device is used to monitor the area below the motor vehicle to determine whether the area is free from obstacles or objects, or whether an object is located below the vehicle at the time of the monitoring. Ultimately, the use of the buffered image data and thus also the generating of the partial image representation or the output of the overall image representation depends on the detection result. If no object is detected under the vehicle, images or image data, which show the area below the vehicle and were recorded significantly earlier, can also be used to determine the partial image representation showing the "ground plane," i.e., their usability was ultimately made possible or released via the sensor detection because it is ensured that there is ultimately no change in the situation below the vehicle between the time the "old" sampled image data were recorded and the current time. This means that the availability and usability of older sampled image data is significantly improved due to the sensor monitoring and recording of the space below the vehicle.

If, on the other hand, the sensor device detects an object under the vehicle, for example, a ball, a toy, etc., the previously recorded image representations cannot be used or can only be used to a limited extent for a "ground plane" display; as a result, the image representation is displayed in a modified manner at least in the area of the partial image representation when compared to the case without obstacle detection. Due to this modified image representation, the driver recognizes that a displayed partial image representation is either not reliable or that the area below the vehicle must in any case be checked. The driver thus receives information about the obstacle or object situation below the vehicle via the modified overall image or partial image representation.

The sampling preferably runs permanently, so that there is always the option of filling the "ground plane," for example, in a top view display. The sampling mode is therefore always activated. If the sampling is not already running, the driver has the option, for example, of having a 360° representation of the environment displayed. If the driver selects the representation option, the system can automatically switch to the "ground plane" display mode, i.e., the partial image representation is automatically activated with the option of parallel sensor monitoring. Alternatively, the representation option for the "ground plane" can also be selected separately from the 360° representation of the environment.

A central element is the at least one sensor device for recording the area below the vehicle. Such a sensor device can be installed as an additional system component for the image representation system according to some embodiments of the present disclosure. Alternatively, a sensor device that is already provided and assigned to another assistance system can also be used. For example, such underbody sensors are already provided in vehicles designed for (partially) automated driving to use them, for example, to carry out release checks for automated starting or the like. Such a sensor or a plurality of such sensors can now also be integrated into the 360° image representation system and consequently serve a further purpose, namely to decide on the usability of the older, buffered image data for determining the "ground plane" image representation. The basically usable sensor device can be any sensor device, for example, an ultrasound sensor, optical sensors or the like, wherein this list is not exhaustive and limiting.

If an object is recorded below the vehicle, different options with regard to the use of this information are conceivable. According to a first alternative of the disclosure, the control device can be designed to delete the images used for the partial image representation and to display the image representation without a partial image representation when an object is detected below the vehicle. In this alternative, the buffered image data provided for the partial image representation are deleted when an object is detected below the vehicle, i.e., no partial image representation takes place because these image data do not correspond to or show the actual situation below the vehicle. The image representation is then displayed without a partial image representation. This way, the driver can already be informed about the fact of an object below the vehicle; however, instead of the partial image representation in this area, a text or a warning symbol, i.e., a warning information within the image area provided for the partial image representation, can possibly also be displayed to indicate an obstacle, and/or an acoustic warning information can also be output on the basis of the sensor recording. However, if no object is detected, the image representation is naturally output with the partial image representation created on the basis of the sampled image data. Deleting does not have to go hand in hand immediately with the recording of the object. Instead, it is also conceivable that, after an object has been detected, it is first checked whether something has changed and what has changed spatially or temporally under the vehicle in order to make it possible, e.g., to recognize that the vehicle is driving, e.g., over a charging plate that is desirable to be seen in the image in order to maneuver accordingly. It is also conceivable to use the distance and the time covered to compare whether an object determined by the underbody sensor system already existed before the vehicle drove over it and thus migrated into the "ground plane" as a result of the driving. If such a situation is recognized, the buffered images can still remain saved despite object detection, and can be deleted at a later time, e.g., after the vehicle has been positioned and stopped.

According to a second alternative of the disclosure, it is conceivable that the control device is designed to display the image representation with a visually marked partial image representation when an object is detected below the vehicle. In this case, despite the detection of an object based on the "old" buffered image data, the partial image representation is generated and also integrated into the overall image representation, but it is marked visually, so that this visual marking signals to the driver that this partial image representation does not correspond to the actual situation below the vehicle.

The visual marking can be done in different ways, for example, the partial image representation can be highlighted in color. For example, it can be colored, especially in red as a signal color. It is also conceivable to display the marking in a flashing manner, for example, by displaying and hiding it, or by displaying it in a swelling and subsiding manner ("glow" display). These various visual marking or display options are also listed by way of example and not limited thereto.

In some embodiments, the control device is designed to automatically detect the sensor information when the speed falls below a speed threshold, particularly during a standstill. It is not necessary for the control device to detect sensor information during normal travel because a "ground plane" representation is not required during normal travel. Instead, the detection takes place primarily during slow travel or standstill, so that the control device only requires corresponding sensor information in such events. According to some embodiments of the present disclosure, the control device automatically detects the sensor information when the speed falls below a corresponding speed threshold, for example, 10 km/h, but especially when the vehicle is at a standstill, since this provides a driving situation, in which image data buffering is expedient because a "ground plane" representation is possibly desired at a later point in time. If the vehicle is parked, for example, in the garage or in a parking lot, the sensor information can be detected as soon as the ignition is switched on or the vehicle is started. In the driving situations described, it is also conceivable that the control device also automatically switches on the sensor device for the detection, provided that it is currently inactive. The measures described above thus ensure that the sensor information is always available when it might be needed.

In addition to the motor vehicle, the present disclosure further relates to a method for operating a motor vehicle, comprising a plurality of image recording devices distributed around the vehicle for recording images of the vehicle environment, a control device for generating an image representation based on the images showing the 360° environment around the motor vehicle, and a display device for displaying the image representation, wherein the control device generates an additional partial image representation showing the area below the motor vehicle on the basis of images which were recorded before the images, on which the displayed image representation is based, and inserts the partial image representation into the displayed image representation for outputting an overall image representation. The method is characterized in that the area below the motor vehicle is detected by at least one sensor device communicating with the control device, wherein the control device modifies the overall image representation of image representation and partial image representation at least in the area of the partial image representation on the basis of the sensor signals.

As already initially described, there are various options for this modification. When an object is detected below the vehicle, the images used for the partial image representation can be deleted by the control device and the image representation can be output without the partial image representation. Alternatively, it is also conceivable for the control device to output the image representation with a visually marked partial image representation or with warning information within the image area provided for the partial image representation when an object is detected below the vehicle. In such case, the partial image representation can be highlighted in color or displayed in a flashing manner.

In some embodiments, the control device automatically detects the sensor information when the speed falls below a speed threshold, particularly during standstill, or when the vehicle is started, wherein the sensor device for the detection is possibly also switched on automatically for the detection, provided that it is not activated.

Further advantages and details of the present disclosure shall become apparent from the embodiments described below and by means of the drawings.

FIG. 1 shows a motor vehicle 1 according to some embodiments of the present disclosure, comprising four image recording devices 2, one arranged on the front and one on the rear of the vehicle, and one image recording device each on the side of the vehicle, for example, on the side-view mirrors, wherein only three image recording devices are shown in FIG. 1. They record environmental image data from the environment of the vehicle and transmit them to a control device 3 which determines an image representation of the 360° environment around the motor vehicle and outputs it to a display device 4 when the driver, for example, has selected a corresponding 360° environment image mode on the output device 4, for example, a touchscreen monitor.

In order to also be able to display the area below the motor vehicle in the image representation, the control device 3 is able to calculate this area within the framework of a determined partial image representation using images or image data recorded earlier and to display it in the image representation, resulting ultimately in one overall image representation which comprises the 360° environment image representation outside the vehicle and the partial image representation integrated therein relating to the area below the vehicle.

In order to ensure the availability of the older image data for as long as possible, at least one sensor device 5 is provided which communicates with the control device 3 and monitors the area below the motor vehicle 1 for any obstacles, for example, a ball which rolled under it, a toy or the like. These objects were not under the vehicle at the time when the earlier images, on which the partial image representation was based, were recorded and can be problematic for the drive if the partial image representation is determined on the basis of the older images, which do not show the actual situation, and which is thus incorrect.

If the control device 3 is in the corresponding mode in order to generate the image representation and also to generate the partial image representation, the area below the vehicle is monitored via the sensor device 5 and, depending on whether an object is determined or not, the corresponding generating and output mode takes shape.

Figure 2:
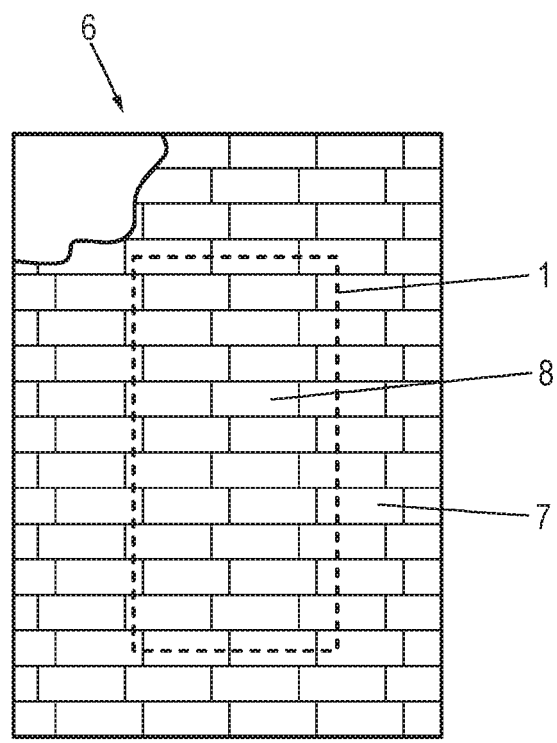
FIGS. 2 to 4 illustrate image representations below a motor vehicle, according to some embodiments of the present disclosure.

FIG. 2 shows a schematic diagram of an overall image representation 6, comprising the image representation 7, which shows the area outside the motor vehicle 1, which is only shown in dotted lines, i.e., effectively partially transparent, and which is detected on the basis of the images currently recorded.

The partial image representation 8 is displayed effectively within the dotted area showing the motor vehicle silhouette, wherein in this case, the partial image representation is determined on the basis of previously recorded images which were recorded at the time the vehicle drove over the area, which is now located below the motor vehicle 1, because the sensor device has not detected an object under the motor vehicle. These image data are verified on the basis of the sensor information insofar as they still show the actual situation below the motor vehicle, even though they are older, i.e., they can be used, even though they are buffered.

Figure 3:
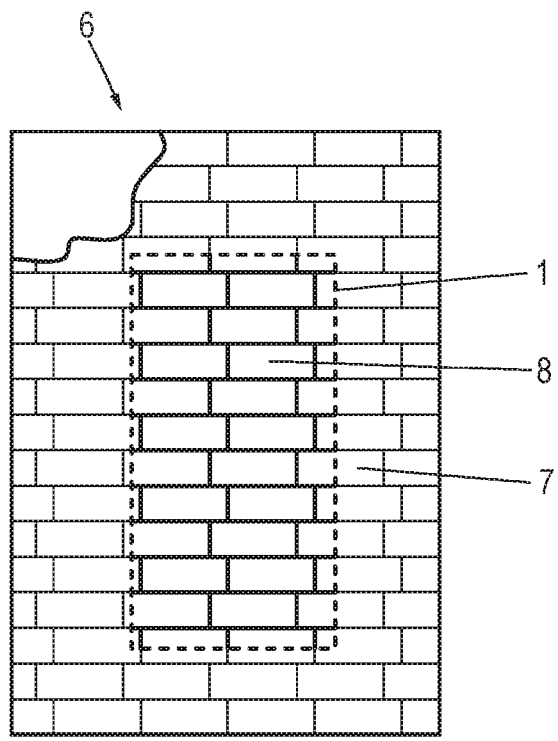

The situation is different in the representation according to FIG. 3. It also shows an overall image representation 6 in the form of a schematic diagram, with the image representation 7 showing the 360° environment and a displayed partial image representation 8. In this case, it is assumed that the sensor device 5 has detected an object below the vehicle. A partial image representation 8 is determined on the basis of image data recorded earlier. However, they no longer correspond exactly to the current situation and are therefore shown visually marked. In the example, this is indicated by the significantly larger line thickness. For example, the partial image representation is output in red but can alternatively also be highlighted in red, or flash, etc. Any visual marking is conceivable as long as it can be immediately detected by the driver. The visual highlighting signals to the driver that the partial image representation does not show the current status below the vehicle and that an object has now been detected below the vehicle, so that the driver must under no circumstances rely on the partial image representation and instead check the area below the vehicle and remove the object. An acoustic warning can also be output.

Figure 4:
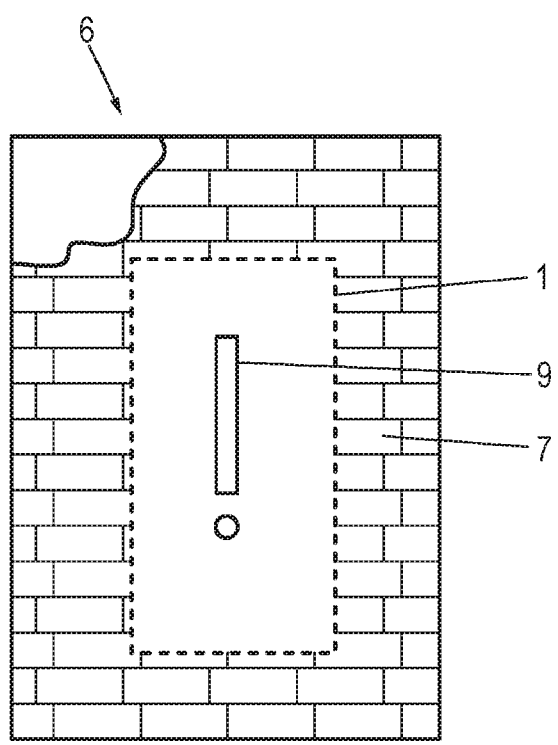

FIG. 4 shows a third variation of an overall image representation 6. It also shows the image representation 7 relating to the 360° environment, which was determined on the basis of the current images. However, the area within the silhouette of the motor vehicle 1 is not filled, i.e., no partial image representation was determined because an object was detected below the vehicle by the sensor device 5. Instead, a warning symbol 9 is shown in this area, which informs the driver of the potentially dangerous situation.

The sensor device 5 can be a separate sensor device that is assigned exclusively to this assistance system. Alternatively, it can also be part of an underbody sensor system, which is used, for example, in semi-autonomously and fully autonomously driving motor vehicles, for monitoring the underbody space and for releasing an automatic starting or the like.

Finally, the control device 3 can be designed for automatic detection of the sensor information when the speed falls below a speed threshold, for example, 10 km/h or 5 km/h or at a standstill. It is thus ensured that, whenever there is the subsequent possibility of displaying a partial image at a later point in time, corresponding sensor information is also recorded. In addition, the control device 3 can naturally also be designed to automatically record the sensor information as soon as the vehicle is about to be restarted, i.e., particularly in such case, the sensor information is also recorded immediately, and it can be ensured that the validity of the older image data is checked for the partial image representation. If necessary, the detection mode of the sensor device can basically also be switched on via the control device, provided that it is initially inactive.

The invention claimed is:

1. A motor vehicle, comprising:
a plurality of image recording devices arranged across the motor vehicle and configured to record images of a vehicle environment;
a display device configured to display an image representation showing the vehicle environment; a sensor device configured to detect an area below the motor vehicle; and
a control device configured to:
generate the image representation using the images of the vehicle environment;
generate an additional partial image representation showing the area below the motor vehicle based on images recorded before the images used to generate the image representation;
integrate the additional partial image representation into the image representation as an overall image representation;
communicate with the sensor device;
automatically detect sensor information from the sensor device when a speed of the motor vehicle falls below a speed threshold; and
modify the overall image representation, in at least a portion of the additional partial image representation, based on the sensor information from the sensor device when an object is detected below the motor vehicle, wherein the object is not in the additional partial image representation generated based on the images recorded before the images used to generate the image representation.

2. The motor vehicle according to claim 1, wherein the control device is further configured to:
delete the images used for the additional partial image representation when the object is detected below the motor vehicle; and
output the modified overall image representation without the additional partial image representation.

3. The motor vehicle according to claim 1, wherein at least a portion of the control device is further configured to:
output the modified overall image representation with the additional partial image representation visually marked, or replaced by warning information, when the object is detected below the motor vehicle.

4. The motor vehicle according to claim 3, wherein the at least the portion of the additional partial image representation in the modified overall image representation is highlighted in color or in a flashing manner.

5. The motor vehicle according to claim 1, wherein the control device is further configured to automatically detect the sensor information when the motor vehicle is at a standstill, or when the motor vehicle is started.

6. A method for operating a motor vehicle, comprising:
recording images of a vehicle environment through a plurality of image recording devices arranged across the motor vehicle;
generating, by a control device, an image representation showing the vehicle environment based on the images;
displaying, by a display device, the image representation;
generating, by the control device, an additional partial image representation showing an area below the motor vehicle based on images recorded before the images used to generate the image representation;
integrating the additional partial image representation into the image representation as an overall image representation;
detecting, automatically, the area below the motor vehicle by a sensor device communicating with the control device, when a speed of the motor vehicle falls below a speed threshold; and
modifying, by the control device, the overall image representation, in at least a portion of the additional partial image representation, based on sensor information from the sensor device when an object is detected below the motor vehicle, wherein the object is not in the additional partial image representation generated based on the images recorded before the images used to generate the image representation.

7. The method according to claim 6, further comprising:
deleting, by the control device, the images used for the additional partial image representation when the object is detected below the motor vehicle; and
outputting the modified overall image representation without the partial image representation.

8. The method according to claim 6, further comprising:
outputting, by the control device, the modified overall image representation with the additional partial image representation visually marked or replaced by a warning information when the object is detected below the motor vehicle.

9. The method according to claim 8, further comprising:
highlighting the at least the portion of the additional partial image representation in the modified overall image representation in color.

10. The method according to claim 8, further comprising:
displaying the at least the portion of the additional partial image representation in the modified overall image representation in a flashing manner.

11. The method according to claim 6, further comprising:
detecting automatically, by the control device, the sensor information when the motor vehicle is at a standstill, or when the motor vehicle is started.

* * * * *